United States Patent
Koveal et al.

(10) Patent No.: US 6,199,768 B1
(45) Date of Patent: Mar. 13, 2001

(54) PROCESS AND APPARATUS FOR ATOMIZING FCC FEED OIL

(75) Inventors: Russell J. Koveal, Baton Rouge, LA (US); Jackson I. Ito, Sacramento, CA (US)

(73) Assignee: Exxon Research and Engineering Company, Florham Park, NJ (US)

( * ) Notice: Subject to any disclaimer, the term of this patent is extended or adjusted under 35 U.S.C. 154(b) by 0 days.

(21) Appl. No.: 09/271,813

(22) Filed: Mar. 18, 1999

(51) Int. Cl.$^7$ ....................................... A62C 5/02
(52) U.S. Cl. ................ 239/8; 239/590.5; 137/896
(58) Field of Search ............... 239/8, 11, 590.5, 239/590; 137/896, 897, 898

(56) References Cited

U.S. PATENT DOCUMENTS

| | | | |
|---|---|---|---|
| Re. 30,003 | * 5/1979 | Reed | 239/11 |
| Re. 33,448 | * 11/1990 | Bauer | 239/11 |
| 2,358,386 | * 9/1944 | Doll | 239/590.5 |
| 2,605,142 | * 7/1952 | Gold et al. | 239/11 |
| 3,750,947 | * 8/1973 | Hughes | 239/11 |
| 3,881,701 | 5/1975 | Schoenman et al. | 259/4 |
| 4,128,206 | * 12/1978 | Bintner | 239/11 |
| 4,151,955 | * 5/1979 | Stouffer | 239/11 |
| 4,398,664 | * 8/1983 | Stouffer | 239/11 |
| 4,653,692 | * 3/1987 | Bolot et al. | 239/590.5 |
| 4,784,328 | 11/1988 | Skraba | 239/432 |
| 5,017,343 | 5/1991 | Cetinkaya | 422/140 |
| 5,037,616 | 8/1991 | Williatte et al. | 422/140 |
| 5,173,175 | 12/1992 | Steffens et al. | 208/157 |
| 5,251,436 | 10/1993 | Brogan | 60/254 |
| 5,289,976 | 3/1994 | Dou et al. | 239/431 |
| 5,318,691 | * 6/1994 | Muldowney | 208/113 |
| 6,003,789 | 12/1999 | Base et al. | 239/433 |

* cited by examiner

Primary Examiner—Andres Kashnikow
Assistant Examiner—Christopher S. Kim
(74) Attorney, Agent, or Firm—Gerald J. Hughes; Michael A. Cromwell (57) ABSTRACT

A liquid atomization process comprises forming a two-phase fluid mixture of a liquid and a gas, under pressure, dividing the fluid into two separate streams which are passed into and through an impingement mixing zone in which they are impingement mixed to form a single stream of two-phase fluid. The mixed, single stream is then passed into and through a shear mixing zone and then into a lower pressure expansion zone, in which atomization occurs to form a spray of atomized drops of the liquid. The impingement and shear mixing zones comprise respective upstream and downstream portions of a single cavity in a nozzle. This is useful for atomizing the hot feed oil in an FCC process.

4 Claims, 8 Drawing Sheets

PROCESS AND APPARATUS FOR ATOMIZING FCC FEED OIL

BACKGROUND OF THE DISCLOSURE

FIELD OF THE INVENTION

The invention relates to FCC processes using a high fluid throughput and low pressure drop, liquid atomizing process and apparatus. The process comprises forming a two-phase fluid mixture of the hot feed oil and a dispersion gas, such as steam, dividing the fluid into two separate streams which are simultaneously passed under pressure, through (i) an impingement mixing zone, and then (ii) a shear mixing zone, to form a single stream which passes into (iii) a lower pressure atomizing zone, in which atomization occurs to form a spray of atomized drops of the liquid. The apparatus comprises a nozzle in which the impingement and shear mixing zones comprise a single cavity.

BACKGROUND OF THE INVENTION

Fluid atomization is well known and used in a wide variety of applications and processes. These include, for example, aerosol sprays, the application of pesticides and coatings, spray drying, humidification, mixing, air conditioning, and chemical and petroleum refinery processes. For most applications, a fluid under pressure, with or without the presence of an atomizing agent, is forced through an atomization nozzle having a relatively small orifice. Atomization occurs at the downstream side of the orifice, with the degree of atomization determined by the orifice size, the pressure drop across the orifice, fluid density, viscosity, and surface tension, etc., as is known. Atomization is increased and the droplet size is decreased, with decreasing orifice size and increasing pressure drop. Increasing the degree of atomization of relatively viscous fluids at high flow rates, such as the heavy petroleum oil feeds used in a fluidized catalytic cracking (FCC) process, or fluid cat cracking as it is also called, is particularly challenging. FCC is an established and widely used process in the petroleum refining industry, primarily for converting high boiling petroleum oils to more valuable lower boiling products, including gasoline and middle distillates such as kerosene, jet and diesel fuel, and heating oil. In an FCC process, a preheated feed, often mixed with an atomization promoting fluid, such as steam, is atomized and brought into contact with a particulate, hot cracking catalyst flowing up through a riser which comprises the catalytic cracking reaction zone. Smaller oil feed droplet sizes in the reaction zone result in more feed conversion to valuable products, particularly with the incorporation of heavy feed material, such as a resid, in the FCC feed. Oil that doesn't make contact with the uprising catalyst particles, thermally cracks primarily to methane and coke. As a consequence, efforts continue to try to find economically viable means to decrease the droplet size of the atomized oil, and preferably without either (i) an unacceptably high pressure drop through the atomizer or nozzle or (ii) increasing the amount of steam or other atomization promoting agent. Examples of such efforts are disclosed in, for example, U.S. Pat. No. 5,289,976 and U.S. Pat. No. 5,173,175 which produce an average feed droplet size in the range of about 400–1000 microns. There is still a need for finer atomization of the heavy oil feed for the FCC process and of other fluids for other processes as well. It would be particularly beneficial if the droplet size of the atomized liquid could be reduced to less than 300 microns.

SUMMARY OF THE INVENTION

The invention relates to a process and apparatus for atomizing a liquid, wherein the process includes impingement and shear mixing. The impingement and shear mixing both occur in a cavity longitudinally extending through the interior of a hollow nozzle means, which comprises the impingement and shear mixing apparatus of the invention. The cavity is open at both ends, which are at the respective upstream and downstream ends of the nozzle. In the process of the invention, at least two separate streams of a two-phase, fluid comprising a gas and the liquid to be atomized, are simultaneously and sequentially passed, under pressure, downstream into and through an impingement mixing zone and a shear mixing zone. In the impingement mixing zone, the separate streams are mixed to form a single, mixed stream, by colliding or impinging at least a portion of each stream against the other. By impingement mixing zone is meant a mixing zone in which mixing of the separate streams occurs mostly (>50%) by impingement and by shear mixing is meant that most of the mixing occurs by shear. Impingement mixing between two fluid streams occurs, when the half angle between the streams ranges between at least 15° up to 90°. This means that the total included angle between the impinging streams ranges from 30–180°, with 180° producing the most violent and chaotic mixing. Shear mixing occurs when the half angle ranges from about 0° to 15°. In the practice of the invention, at least a portion (e.g., $\geq 20\%$) of each fluid stream in the impingement mixing zone also has a flow component parallel to the downstream flow direction, so that not all mixing in this zone occurs by impingement. In a preferred embodiment, at least the laterally outer, peripheral portion of each fluid stream is directed against the other in the impingement mixing chamber or zone, preferably at an angle of 90°±30° normal to the longitudinal flow direction of the fluid, more preferably 90°±10°, still more preferably 90°±5°, and most preferably 90°±2°. Fluid expansion in the impingement and shear mixing zones is minimized. The impingement mixing zone, the shear mixing zone and the atomizing zone are all in fluid communication. The mixed stream is then passed into and through a shear mixing zone, in which further mixing of the fluid occurs. The impingement and shear mixing zones comprise respective upstream and downstream portions of the single cavity or chamber, within the impingement and shear mixing means or nozzle, with the downstream end of the impingement mixing zone opening into the entrance or upstream end of the shear mixing zone. The kinetic energy imparted to the fluid by the impingement and shear mixing forms a single stream comprising a mixed, two-phase fluid comprising the gas and liquid which, when atomized, produces small droplets of the liquid dispersed in a gas continuous phase. The average size of the liquid drops or droplets dispersed in the gas phase after passing through the nozzle is smaller (e.g., at least 10% smaller and preferably at least 50% smaller) than upstream of the nozzle. The shear mixing zone opens downstream into an atomizing means. The atomizing means typically and preferably comprises or includes an orifice having a smaller cross-sectional area perpendicular to the fluid flow direction through the shear mixing zone, than the smallest cross-sectional area perpendicular to the fluid flow direction in the shear mixing zone. This results in a pressure drop across the orifice and attendant further shear of the two-phase fluid as it enters the lower pressure expansion zone, which comprises the atomizing zone, a portion of which may comprise the downstream portion of the shear mixing zone. This shear results in a further reduction of the size of the atomized liquid droplets. As the fluid passes into the lower pressure expansion or atomizing zone, it rapidly expands, thereby producing a spray comprising atomized drops of the liquid. This rapid expansion and production of a spray of liquid droplets comprises the atomization. Typically and preferably, the downstream fluid exit of the shear mixing zone opens into an adjacent spray distributor, for shaping the spray into the desired shape. The spray distributor forms part of the atomizing zone and may or may not comprise part of the nozzle. This is a preferred embodiment for minimizing coalescence of the liquid phase prior to atomization. However, in another embodiment, the shear mixing zone may open downstream into the upstream end of an atomizing means which includes a hollow fluid conduit open at both ends and having an atomizing orifice and a spray distributor at its downstream end. In this embodiment, it is preferred that the cross-sectional area of the conduit perpendicular to the direction of fluid flow be greater than the smallest cross-sectional area of the shear mixing zone and the atomizing orifice, to minimize agglomeration or coalescence of the liquid phase, as the fluid flows downstream through the conduit, to the orifice and distributor.

This process and apparatus are useful for atomizing a large volume of hot feed oil into the riser reaction zone of a fluid cat cracker, to achieve a relatively small drop size, and uniform drop size distribution of the atomized oil drops or droplets, with a minimal pressure drop across the mixing and atomizing nozzle. For example, with a four inch diameter nozzle, it is possible to atomize thirty pounds per second of the hot oil feed, at a pressure drop across the nozzle of less than fifty, and preferably less than forty pounds per square inch. When used in association with atomizing an FCC feed oil, the nozzle will comprise part of a feed injector, or feed injection unit, as it is sometimes referred to, which will contain the nozzle of the invention and terminate downstream in an atomized spray distributor tip. Typically a plurality of feed injectors are employed, circumferentially spaced around the upstream end of the cat cracking reaction zone which, in the case of an FCC unit, is proximate to the bottom of the riser. The spray distributor tip at the downstream end of the feed injector protrudes into the cat cracking riser reaction zone, into which it injects the hot oil spray. The hot oil droplets meet with flowing hot, regenerated cat cracking catalyst particles, which catalytically crack the hot feed oil into lower boiling and more useful products. The hot feed oil will typically first be mixed with steam (and/or other dispersion/atomizing gas) upstream of the nozzle means, to form a two-phase fluid comprising a steam phase and a hot, FCC oil liquid phase. This also increases the velocity of the flowing fluid. Mixing of the steam and oil upstream of the nozzle means is typically achieved in the feed injector, by steam or other dispersion gas sparging means, as is known. This two-phase fluid stream is split or divided into two separate streams, which, in one embodiment which is a preferred embodiment, comprises a stream splitting means at the upstream, fluid entrance of the nozzle. In one such embodiment, both streams are then simultaneously fed into and through two separate fluid entrances at the upstream end of the nozzle and into the upstream end of the cavity defining the impingement mixing zone. The fluid entrances are preferably symmetrically identical and laterally spaced apart equidistant from, and in the same plane, perpendicular to the longitudinal axis of the cavity in the nozzle. In the impingement mixing zone, a flow component perpendicular to the longitudinal axis of the mixing zone and directed towards the other stream is imparted to at least a portion of each stream. This causes at least a portion of each stream to impinge against the other, which results in turbulent impingement mixing and a concomitant reduction in the size of the oil phase structure. The resulting mixed fluid stream then passes into and through the shear mixing zone downstream and adjacent to the impingement mixing zone, for further mixing, with less pressure drop than that which occurs in the impingement mixing zone. The mixed stream then passes through an atomizing orifice and into a lower pressure atomization zone, part of which may comprise a portion of the shear mixing zone. The cross-sectional area of the atomizing orifice normal to the fluid flow direction, is typically smaller than that of the fluid conduit(s) feeding the fluid to the nozzle. This results in a velocity increase of the fluid flowing through the orifice and into the lower pressure atomizing zone. This velocity increase produces additional shearing of the two-phase fluid which, in conjunction with the rapid expansion of the gas phase through and downstream of the nozzle into the lower pressure zone, produces a further reduction in the size of the oil droplets in the atomized oil spray. A spray distributing means, such as an expanding fan-shaped spray distributor, the interior of which comprises a fan-shaped cavity open at its upstream and downstream ends, is preferably adjacent the downstream side of the atomizing orifice, for controlling the shape of the atomized spray. This spray distribution means may or may not comprise part of the nozzle, as mentioned above and which is described in greater detail below.

The apparatus comprises a nozzle having a single impingement and shear mixing chamber or cavity having a longitudinal axis extending through the nozzle, with at least two fluid inlets at its upstream end, and a single fluid outlet, which may terminate in an orifice, at its downstream end. The inlets and outlet are longitudinally spaced apart along the longitudinal axis. The cross-sectional area of the impingement mixing zone portion of the cavity, perpendicular to the longitudinal axis and parallel to the plane of the flat ends of the nozzle, is smaller at its downstream end then its upstream end. At least a portion of the cross-sectional area of the shear mixing zone portion of the cavity, perpendicular to the longitudinal axis and parallel to the plane of the flat ends of the nozzle, decreases in the downstream flow direction. In one embodiment the chamber or cavity is formed by at least two pairs of spaced apart and opposing side walls, with each wall of each pair being laterally spaced apart, equidistant from said longitudinal axis, with the other wall of the pair. This forms a cavity having an overall rectangular cross-section, perpendicular to the fluid flow direction through the cavity. With respect to the cross-sectional area, by the fluid flow direction is meant the overall fluid flow direction through the cavity, which will typically be parallel to the longitudinal axis of both the cavity and nozzle. The cross-sectional area is varied by varying the lateral distance between at least a portion of at least one pair of opposing walls. In some embodiments, for the shear mixing zone, this lateral decrease continues progressively downstream, from the chamber entrance to its exit. In other embodiments of the shear mixing zone, it will continue to decrease only for part of the downstream distance and then increase again. The cross-sectional area of the chamber is greatest at the upstream end of the impingement mixing zone, near the fluid entrances. In still other embodiments, the cross-sectional area of the shear mixing zone downstream of the impingement mixing zone will not vary proceeding downstream. This difference in distance results, at least in part, by the surface of at least one pair of opposing walls being arcuate, stepped, angled, or any combination thereof, to provide to each fluid stream entering the chamber, both a downstream flow component, parallel to the longitudinal axis of the chamber, and a flow component directed radially inward and perpendicular to the longitudinal chamber axis.

The radially inward flow component provides the impingement mixing, which reforms a single mixed stream in the impingement mixing chamber. In one embodiment, which is a preferred embodiment, a single stream of fluid is split into the at least two separate streams by a stream-splitting or diverting means, which forms a portion of the upstream end of the nozzle and is located adjacent the chamber entrances.

In one sense, therefore, the invention comprises a process for atomizing a liquid into a spray of liquid drops, by separately passing at least two separate streams of a two-phase fluid comprising a gas phase and a liquid phase comprising the liquid to be atomized, into an impingement mixing zone under pressure, in which a portion of each stream impingement mixes with the other, to form a single, impingement mixed fluid stream, in which the surface area of the liquid phase is increased to greater than that in the separate streams prior to mixing. This impingement mixed stream is then further mixed, primarily by shear mixing, in a shear mixing zone downstream and adjacent to the impingement mixing zone with which it is in direct fluid communication, to further increase the surface area of the liquid phase. This further mixed fluid stream is then atomized, by passing it into an expansion zone, which is at a lower pressure, in which the gas expands and forms a spray comprising drops of the atomized liquid. The impingement and shear mixing sequentially occur in a single cavity longitudinally disposed, along the fluid flow direction, in a nozzle mixing means. The downstream exit of the cavity is in fluid communication with the lower pressure expansion zone.

The apparatus of the invention briefly comprises a body containing a cavity within, comprising an impingement mixing zone and a shear mixing zone downstream of the impingement mixing zone, wherein the cavity is elongated in the direction of fluid flow and extends through the body. Preferably, the body contains a means for splitting a fluid stream adjacent the upstream end of the body into two separate streams, with an orifice entrance for each stream to enter the cavity and into the impingement mixing zone. The apparatus may also include a spray distributing means adjacent to its downstream end, the fluid entrance of which is adjacent the fluid exit of the shear mixing zone, with which it is in fluid communication. In an embodiment relating to a fluid cat cracking process, the invention comprises the steps of:

(a) separately passing two streams of a two-phase fluid comprising a gas phase and a liquid phase comprising hot FCC feed oil, into an impingement mixing zone under pressure, in which a portion of each stream impingement mixes with the other, to form a single, impingement mixed fluid stream, in which the surface area of the liquid phase is increased to be greater than that in both streams prior to mixing;

(b) passing the mixed stream formed in (a) into a shear mixing zone, downstream and adjacent to the impingement mixing zone with which it is in direct fluid communication, to further mix the mixed stream, primarily by shear mixing, to further increase the surface area of the liquid phase;

(c) atomizing the shear mixed stream, by passing it through an atomizing means and into a lower pressure expansion zone in which said gas expands and forms a spray comprising drops of the atomized liquid, wherein the impingement and shear mixing sequentially occur in a single cavity longitudinally disposed, along the fluid flow direction, in a mixing means, and (d) passing the atomized spray into a riser reaction zone, in which it contacts a particulate, hot, regenerated cracking catalyst, at reaction conditions effective to catalytically crack the oil and produce lower boiling hydrocarbons.

The lower boiling. hydrocarbons are recovered and typically at least a portion are upgraded by one or more upgrading operations, such as fractionation. The cracking reaction produces spent catalyst particles, which contain strippable hydrocarbons and coke, as is known. The lower boiling hydrocarbons are separated from the spent catalyst particles in a separation zone and the spent catalyst particles are stripped in a stripping zone, to remove the strippable hydrocarbons to produce stripped, coked catalyst particles. The stripped, coked catalyst particles are passed into a regeneration zone, in which they are contacted with an oxygen-containing gas, at conditions effective to bum off the coke and produce the hot, regenerated catalyst particles, which are then passed back up into the riser reaction zone.

DETAILED DESCRIPTION

The two-phase fluid fed into the mixing nozzle may be gas-continuous or liquid-continuous, or it may be a bubbly froth, in which it is not known with certainty if one or both phases are continuous. This may be further understood with reference to, for example, an open cell sponge and a closed cell sponge. Sponges typically have a 1:1 volumetric ratio of air to solid. An open cell sponge is both gas(air) and solid continuous, while a closed cell sponge is solid continuous and contains discrete(dispersed) gas cells. In an open cell sponge, the solid can be said to be in the form of membranes and ligaments (such as may exist in a two-phase gas-liquid froth or foam). In a closed cell sponge, the gas can be envisioned as in the form of a dispersion of discrete gas globules in the solid. Some sponges fall in-between the two, as do some two-phase fluids comprising a gas phase and a liquid phase. It is not possible to have a sponge that is gas-continuous and not also solid-continuous, but it is possible to have a two-phase gas and liquid fluid that is gas-continuous only. Therefore, the particular morphology of the fluid as it is passed into and through the mixing nozzle of the invention, is not always known with certainty. Irrespective of this, for this embodiment of the invention, there must be sufficient gas present in the fluid entering the nozzle, for the impact and shear mixing to increase the surface area of the liquid phase. This is reflected in reducing (i) the thickness of any liquid membrane, (ii) the thickness and/or length of any liquid rivulets, and (iii) the size of any liquid globules in the fluid, either before or during the atomization. In the practice of the invention, impingement and shear mixing in the nozzle and through orifices will only occur with a two-phase fluid comprising a gas phase and a liquid phase. It is preferred that the fluid comprises mostly gas on a volumetric basis (e.g., a volumetric gas to liquid ratio of at least 2:1) for efficient shear mixing. A single phase fluid (e.g., liquid) passed through the nozzle, will have its kinetic energy increased directly proportional to the pressure drop across the nozzle. With a two-phase fluid comprising a gas phase and a liquid phase, the gas velocity is increased relative to the velocity of the liquid phase, (i) in the impingement mixing zone, (ii) in the nozzle shear mixing zone, and (iii) when the fluid passes through an orifice of smaller cross-section perpendicular to the fluid flow direction than the fluid conduit means upstream of the orifice (a pressure-reducing orifice). This velocity differential between the gas and liquid phases results in ligamentation of the liquid, particularly with a viscous liquid, such as a hot FCC feed oil. By ligamentation is meant that the liquid forms elongated globules or rivulets. The velocity differential is decreased during shear mixing. Thus, passing a two-phase fluid through a pressure-reducing orifice or impingement mixing it, produces a velocity differential between the gas and liquid which results in ligamentation of the liquid and/or dispersion of the liquid in the gas due to shearing of the liquid into elongated ligaments and/or dispersed drops. Additional shear of the liquid occurs when the fluid enters the orifice entrances of the nozzle and through the atomizing orifice. This additional shear also adds to reduction of the ultimate droplet size of the oil droplets in the atomized spray. The atomizing zone is at a lower pressure than the pressure upstream of the atomizing orifice. Consequently, the gas in the fluid passing through the atomizing orifice rapidly expands, thereby dispersing the liquid rivulets and/or droplets into the atomizing zone. Any rivulets break into two or more droplets during the atomization. The atomizing orifice may be a discrete, readily discernable orifice downstream of the shear mixing zone, or it may be in the form of a region or zone of the smallest cross-sectional area in the shear mixing zone. In the later case, fluid atomization begins in the shear mixing zone of the nozzle. In the strictest technical sense, atomization sometimes refers to increasing the surface area of a liquid and this occurs when the steam or other atomizing gas is mixed with, or injected into, the liquid to be atomized. However, in the context of the invention, atomization means that as the fluid passes through the atomizing orifice, the liquid phase breaks up, or begins to break up, into discrete masses in the gas phase and this continues as the fluid continues downstream and the liquid is atomized into a spray of droplets dispersed in the gas phase.

Referring now to FIG. 1, there are shown four different schematic views of an embodiment of an atomizing nozzle of the invention 10. Thus, nozzle 10 is shown as a cylindrical body 12, the interior of which comprises a single, unitary and generally longitudinal cavity 14, open at both ends and having a longitudinal axis coincident with the longitudinal axis of the nozzle. The upstream and downstream ends of cavity 14 are located at the respective upstream 16 and downstream 18 ends of the nozzle, for fluid to flow through. Cavity 14 is generally rectangular in cross-section normal to the longitudinal axis and is divided into three sequential zones, all of which are in fluid communication, with adjacent zones in direct fluid communication. Beginning at the upstream end and progressing downstream, cavity 14 comprises a fluid expansion zone 20, followed by an impingement mixing zone 22 and then a shear mixing zone or throat portion 24. The upstream opening of the cavity comprises a pair of symmetrically identical and circle segment-shaped fluid openings 26 and 26', separated in this embodiment by a fluid stream splitting means 28. Means 28 in this embodiment comprises a generally rectangular shaped plate, which bisects the circular entrance end of the nozzle, for splitting a stream of flowing fluid just upstream of the nozzle, into two separate and equal streams, which pass into and through the fluid openings 26 and 26'. Each of the two parallel edges of the plate form the chordal portion of each respective fluid entrance. The downstream end of the cavity 14 comprises a non-circular exit orifice 30. In this embodiment the orifice is shown to be square-shaped, although other shapes may also be employed. A non-circular orifice is preferred. This exit orifice may or may not comprise at least a portion of the atomizing means. Cavity 14 is formed by two different pairs of opposing walls (36-38-23)–(36'-38'-23') and 34–34', as shown. Walls 34 and 34' are identical, flat, parallel and are rectangular in shape, while 36-38-23 and 36'-38'-23' are symmetrical. The same point on a wall pair is equidistant from the longitudinal axis for each wall, with the intersection of walls (36-38-23 )-34 and (36'-38'-23')-34' each forming a right angle. Walls 36-38-23 and 36'-38'-23' each begin upstream with an arcuate or circular shape perpendicular to the longitudinal axis of the nozzle, substantially conforming to the circular shape of the upstream feed conduit and the fluid entrances of the nozzle. This shape is maintained until the steps 38–38' at the entrance to the throat portion 24 is reached, at which point it changes to a flat shape which continues (23 and 23') until it terminates in the square-shaped exit 30, to more effectively utilize the impingement momentum. This produces a more uniform size distribution of the atomized oil droplets, than a circular or arcuate exit would. The two symmetrically identical and segment-shaped fluid openings 26 and 26', are diametrically opposite and radially spaced apart, equidistant from the longitudinal axis. The combined cross-sectional areas of these two segment-shaped fluid openings is smaller than that of the small expansion zone 20, but larger than the rectangular opening of the impingement mixing zone immediately downstream of 20, in order to reduce the pressure drop of the fluid entering into the mixing zones. By cross-sectional area is meant the cross-sectional area normal to the average fluid flow through the nozzle. In this embodiment, it is also the cross-sectional area normal to the longitudinal axis of the nozzle and this is typical for a nozzle of the invention. Hereinafter, all references to cross-sectional area will refer to the area normal or perpendicular to the direction of fluid flow. In this embodiment and in any typical embodiment of the invention, the fluid openings into the cavity will be velocity-increasing fluid openings, because of their smaller cross-sectional area compared to that of the flowing fluid stream, before being split into two separate streams. This can be seen, for example, in FIG. 5. Looking at FIG. 1(*b*), a two-phase fluid stream comprising a gas phase and a liquid phase comprising the liquid to be atomized, flowing from upstream into and through cavity 14 in nozzle 10, is forced to split into two equal streams by means 28, with each split stream entering into the nozzle through respective opening pairs 26 and 26', in the upstream end 16 of the nozzle. In the embodiment shown in FIG. 1(a), the pressure drop due to the impingement onto the splitting means 28 may be too high for some applications and, hence, a lower pressure drop means for introducing fluid into the nozzle can be employed. Thus, two separate fluid streams from any convenient source and comprising a two-phase mixture of a gas phase and a liquid phase, may be fed into the nozzle, at two radially spaced apart and substantially equal size fluid openings. In this embodiment, the two separate feed lines feeding the fluid two separate nozzle inlets, have to be sized so as to achieve the desired fluid inlet velocity. Looking at FIG. 1(b), each split stream is introduced into a respective top and bottom of the cavity, through the velocity-increasing openings 26 and 26'. As the fluid flows through each opening into the cavity, its velocity is increased because of the smaller cross-sectional area of the openings compared to that of the upstream conduit. This results in shearing forces because the lighter gas phase accelerates more quickly than the heavier liquid phase. After this, each fluid stream passes into the expansion zone, which is a controlled expansion zone 20 (110 in FIG. 3(b) and FIG. 3(d)), in the sense that the fluid is not permitted to freely expand, as it is in an atomizing zone. This slight expansion zone between the two fluid entrances and the upstream end of the impingement mixing zone reduces the pressure drop from what it would otherwise be if the expansion zone was not present. The outer peripheral portion of both flowing fluid streams impacts or impinges directly onto the right angle steps 38–38' and is forced radially inward to impinge directly into each other in impingement zone 22. In this embodiment in which steps 38–38' are both at right angles to the longitudinal axis of the nozzle and cavity, the included angle between the impinging fluids is 180°. Thus, the fluid impacting plane, taken as vertical in the drawing, is normal to the longitudinal axis of the nozzle. This radial, right angle impingement directs the radially inward component of both streams to a point on the longitudinal axis, which produces the maximum impingement mixing possible. As the fluid continues downstream, it enters the shearing zone whose cross-sectional area decreases in the downstream direction, to increase the flow velocity and further reduce the size of the liquid globules, primarily by shearing. While there is no abrupt change from the impingement mixing zone to the shear mixing zone, in this embodiment, mostly shear mixing begins downstream of the steps 38–38'. One pair of opposing walls 23 and 23' defining the shear mixing zone, are sloped and converge inward in the downstream flow direction, to the square exit orifice 30. The gradual decrease in the cross-sectional area of the shear mixing zone from this downstream wall convergence results in an increase in fluid flow velocity, with the maximum velocity achieved at the downstream nozzle exit orifice 30.

Figure 1A:
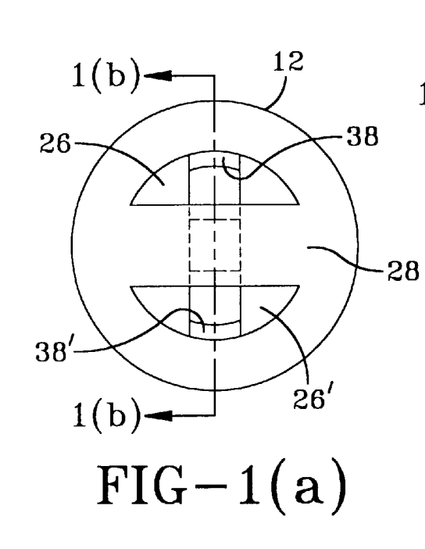
FIGS. 1(a) through 1(d) schematically illustrate various views of an atomizing nozzle of the invention, with FIGS. 1(a) and 1(c) being respective views from the upstream and downstream ends of the nozzle, FIG. 1(b) being a cut-away side view and FIG. 1(d) a partial cut-away top view.
Figures 1B, 1C:
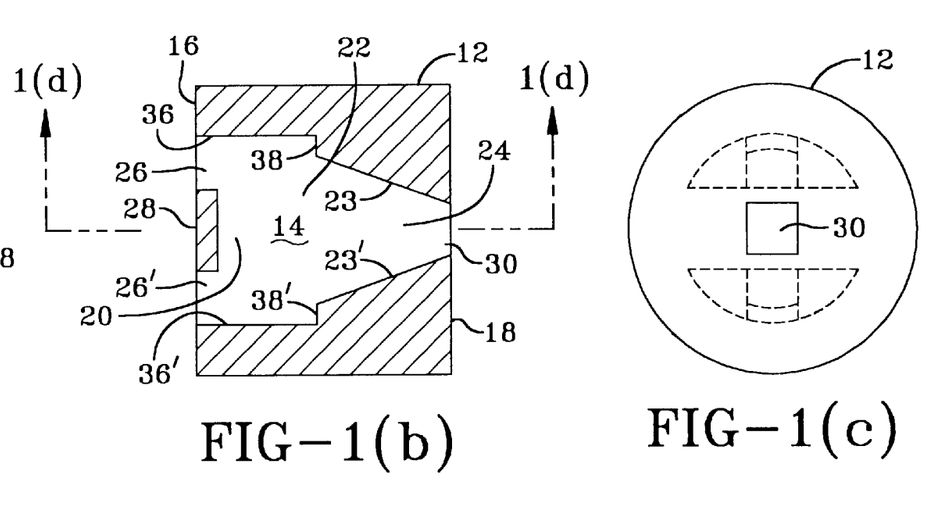
Figure 1D:
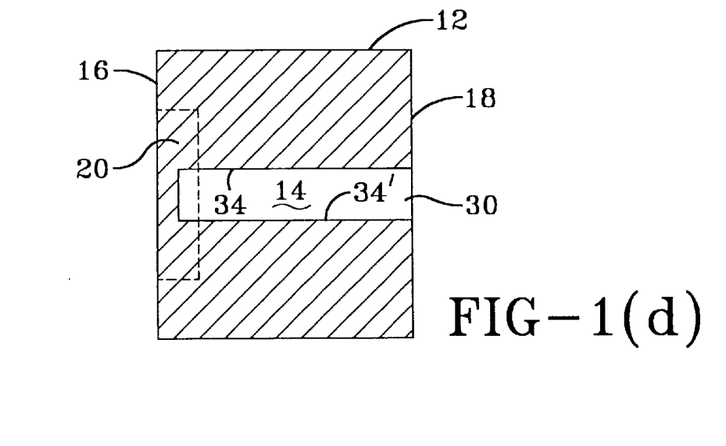
Figure 2A:
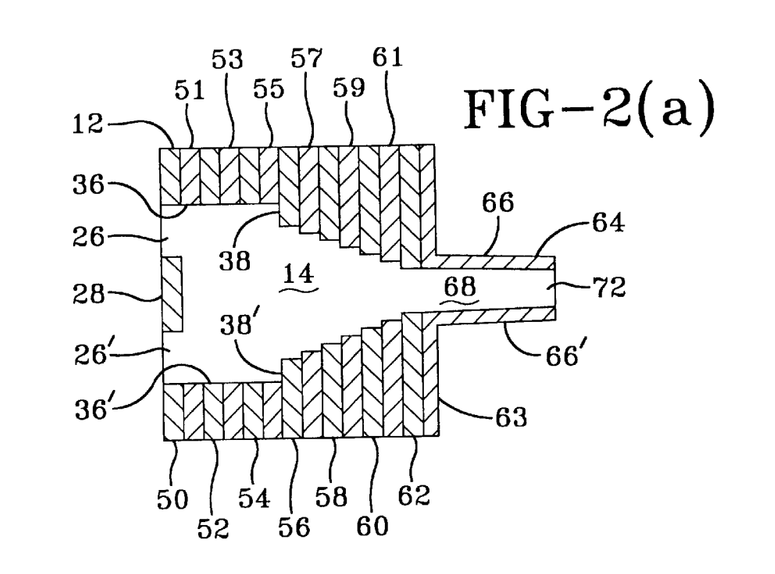
FIGS. 2(a) through 2(d) schematically illustrate the nozzle of FIG. 1 fabricated of stacked metal platelets, including an atomizing distributor as part of the nozzle.
Figure 2B:
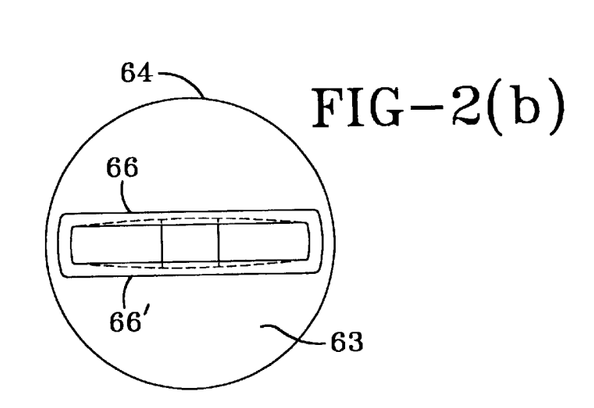
Figure 2C:
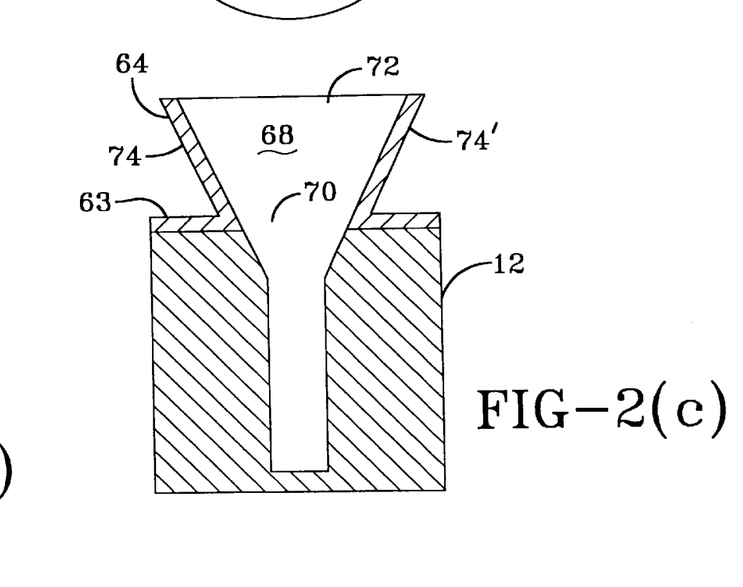
Figure 2D:
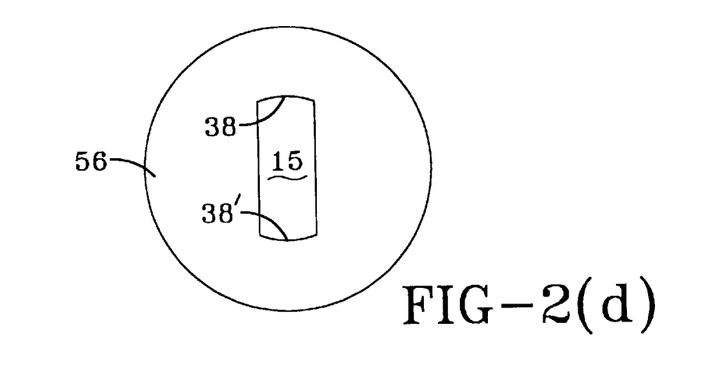

Nozzle 10 can be fabricated in a number of different ways, at the discretion of the practitioner. Thus a lost wax or investment casting process could be employed, as well as forging and other casting processes. The nozzle may be fabricated of a ceramic, metal or combination thereof. Fabrication of a nozzle using a plurality of stacked, relatively thin metal plates or platelets, in order to form an article having fluid passage means therein, is known and disclosed as useful for rocket motors and plasma torches in, for example, U.S. Pat. Nos. 3,881,701 and 5,455,401. This fabrication technique is also useful in fabricating nozzles of the invention, including the embodiments generally disclosed and shown in FIGS. 1–6, and nozzles of the invention have been fabricated using this technique. However, the invention is not intended to be limited to the use of this technique for nozzle fabrication. FIG. 2(a) schematically illustrates a cross-sectional side view of nozzle 10 of FIG. 1, fabricated of a plurality of stacked metal platelets, 50–62. The individual metal platelets are prepared having the required cavities and any other passages therein, as holes, slots or orifices extending through the platelet. They are then stacked together, bolted and/or diffusion bonded together, to form the final nozzle. Thus, in FIG. 2(a), starting from the upstream end of the nozzle, platelet 50 comprises a disk having the two circle segment-shaped openings in it defined by the stream splitting plate 28, as illustrated in FIG. 1(a). FIG. 2(d) schematically illustrates disk 56, which includes the shoulders 38 and 38'. In FIG. 2(d), disk 56 is a solid metal disk having a generally rectangular cavity 15 in its center portion. This illustrates the relative size and shape of the cavity 14, adjacent the impingement mixing shoulders. The gradual decrease in the distance between opposite sides of the converging walls (the vertical size of the opening in each platelet), starting with 57 and proceeding to 62, approximates the opposing, flat angled throat wall sections 23 and 23', illustrated in FIG. 1(b). While each of the radially inward steps of each successive disk 57–62 is not large enough to impart as much radially inward momentum to the flowing fluid, as in the case of disk 56, they do continue to impart a radially inward, impingement mixing component to the flowing fluid. FIG. 2(a) also includes an atomizing spray distributor 64 at the downstream end of the nozzle, for producing a generally flat and fan-shaped spray of the atomized liquid. Other views of tip 64 are shown in FIGS. 2(b) and 2(c). This unit is welded, bolted, brazed or otherwise attached to the nozzle, thereby forming a part of the nozzle. In this embodiment, distributor 64 includes a flange 63 for attachment to a nozzle. The flange has an orifice 70 in its center, normal to the fluid flow direction adjacent to, and the same size and shape as the nozzle exit (30 in FIG. 1). Orifice 70 opens up downstream into a generally flat and divergent fan-shaped spray distribution tip, defined by opposing wall pairs 66–66' and 74–74', which define a fan-shaped atomizing zone 68. Zone 68 is seen slightly converging in the vertical direction proceeding downstream, as shown in FIG. 2(a), to control the rate of shear mixing while the flow is diverging in the horizontal direction, as shown in FIG. 2(c). The tip ends downstream in orifice 72, which is oriented normal to the outward flow spray direction and has its longest dimension generally perpendicular to the impingement fluid flow direction imparted by 38–38'. The fluid exiting the orifice 30 of the nozzle, enters into the controlled expansion zone 68, through orifice 70. This further shears the fluid, as mentioned above, thereby further reducing the drop size of the liquid dispersed in the fluid. Expansion zone 68 is at a lower pressure than that upstream of orifices 30 and 70, with the result that the gas phase rapidly expands and atomizes the liquid to produce a spray of the atomized liquid droplets. This further shears the liquid droplets and the fan shape of the atomizing tip produces a fan-shaped spray of the liquid droplets, which continue through zone 68 and into the lower pressure downstream location shown in FIG. 7.

FIG. 3, schematically illustrates another embodiment of an atomizing nozzle 100 of the invention. In this embodiment, as in the other embodiments of an impingement and shear mixing nozzle of the invention shown in the Figures, each split stream enters the interior cavity of the nozzle substantially parallel to the overall fluid flow direction, which is parallel to the longitudinal axis of the cavity and, in these embodiments, also the nozzle. These streams are equal, symmetrical and enter the cavity at a respective top and bottom, being diametrically separate and opposed, as shown. In the impingement mixing portion of the cavity, a radially inward flow component, normal to the longitudinal axis, creates the impingement mixing. The single stream formed in the impingement mixing zone or portion, flows generally parallel to the longitudinal axis in the shear mixing zone and out of the nozzle. A view of the nozzle from the upstream end and a side view in partial cut-away fashion are respectively shown in FIGS. 3(*a*) and 3(*b*). Thus, nozzle 100 is shown as a cylindrical body 102 containing a single, longitudinal cavity 104 within, being symmetrical about its longitudinal axis, which is coincident with the longitudinal axis of the nozzle. Cavity 104 is open at both ends for fluid to flow through, with its fluid entrance and exit ends, extending through the fluid upstream 106 and exit downstream 108 ends of the nozzle, as shown. Cavity 104 comprises a sequence of three zones, all in fluid communication with each other. Starting at the upstream end of the cavity they are, (i) a fluid expansion zone 110, (ii) a fluid impingement mixing zone 112 and a fluid shear mixing zone 114, with the impingement and shear mixing zones having substantially rectangular cross-sections. As is the case for the nozzle of FIG. 1, the fluid passed from upstream into nozzle 100 is a two-phase fluid comprising a gas phase and a liquid phase comprising the liquid desired to be atomized. The upstream end 106 of the nozzle contains a pair of symmetrically identical fluid entrance orifices 116 and 116', diametrically opposed and radially spaced apart, equidistant from the center and in the shape of a segment of a circle. As is the case for the nozzle of FIG. 1, in this embodiment the two fluid entrances are also radially equidistant from the center and separated by a generally rectangular stream-splitting plate 118, which bisects the circular entrance end of the nozzle, and with each of the two parallel edges 119 and 119' of the plate, forming the chordal portion of each respective fluid entrance. Thus, a fluid flowing from upstream into the nozzle is split into two identical streams, each of which passes into and through a respective fluid entrance 116 and 116' and into the interior of the nozzle. In this embodiment, and as is shown in FIG. 4, the cross-sectional area of each fluid entrance is less than half that of the upstream fluid conduit. This means that the velocity of each of the two streams entering a respective entrance is greater than that immediately upstream. This produces a shearing action on the two-phase fluid, thereby increasing the surface area of the liquid phase. Looking at FIGS. 3(*b*), FIG. 4(*a*) and FIG. 5, a fluid stream flowing into and through nozzle 100 is forced to split into two equal streams by means 118, each of which enters into the nozzle through respective equal size orifices 116 and 116'. While splitting a single fluid stream into two separate streams in this fashion is convenient, the invention is not limited to this embodiment. In the embodiment shown in FIG. 3, the pressure drop due to the impingement onto the splitting means may be too high for some applications. A lower pressure drop means can be employed or two separate streams from any convenient source may be fed into the upstream end of the chamber 104, and preferably through shear-inducing orifices. Also, as is the case for the nozzle of FIG. 1, the cross-sectional area relationships of the fluid entrances, the expansion zone 110 and the upstream opening of the impingement mixing zone also apply here. As each fluid stream enters into the open-ended, unitary and singular cavity 104 longitudinally extending through the nozzle, it immediately enters into the expansion zone 110 just upstream of the impingement mixing zone 112, so that it can be turned radially inward without an excessive pressure drop. This is not an uncontrolled expansion, but it minimizes coalescence of the smaller liquid drops formed by passing the fluid through the entrances. As each stream continues downstream, the circumferentially outer portion contacts a means which imparts a radially inward flow component to it, thereby forcing a portion of each stream to flow radially inward, where it impinges and impacts the radially inward flow from the other stream, head on. This causes violent and chaotic mixing, which converts kinetic energy into increased liquid phase surface tension energy, as reflected in an increase in the surface area of the liquid phase. This surface area increase ultimately manifests itself as smaller liquid droplets in the final atomized liquid spray. Two arcuate, circumferential or peripheral shoulders, 122 and 122', extending radially inward from walls 125 and 125', impart the radially inward flow component to each fluid stream as it impinges upon each shoulder, thereby forcing a portion of each stream against a portion of the opposite stream being directed towards it. Thus, the radially inward flows are directed against each other in a head-on fashion, thereby producing violent and turbulent mixing to further increase the surface tension energy of the liquid phase of the fluid. This inward flow component is normal to the longitudinal axis of the nozzle. The plane of both of the shoulders 122 and 122' is normal to the longitudinal nozzle axis and parallel to the flat (106 and 108) ends of the nozzle and, therefore, concomitantly parallel to the fluid exit orifice 128 of the nozzle and mixing cavity. Although slight divergence from normal can be tolerated, it is preferred that the plane of the shoulder surface be within 90°±5° of the longitudinal axis of the nozzle. This is also the case for the nozzle of FIG. 1. It is preferred in the practice of the invention that the fluid exit orifice of the nozzle not be circular for the reasons given previously. Thus, the exit orifice 128 will have one dimension longer than the other, and it is preferred that the longer dimension of the generally rectangular-shaped impingement mixing zone be normal or perpendicular to the longest dimension of the fluid exit orifice. The turbulent fluid passes from the impingement mixing zone into and through the shear mixing zone 114, which may also be referred to as a throat. This zone is also formed by two pairs of opposing and generally parallel walls 130–130' and 126–126', which intersect at a 90° angle, to form the generally rectangular-shaped cross-section. As is shown in FIGS. 3(*b*) and 3(*d*), the shear mixing zone in this embodiment is defined by these two pairs of radially opposite and opposing walls, one pair of which, 126 and 126', converge inward in the downstream flow direction and the other pair of which, 130 and 130', diverge outward in the downstream flow direction. The net effect is either a generally overall constant cross-section of the shear mixing zone normal to the fluid flow, or one that converges and then diverges by from about 10–50% larger than the minimum cross-sectional area. For this embodiment, it will be taken as a generally constant cross-section. This design of diverging and converging walls produce a shear mixing zone having a lower fluid pressure drop through it, than the embodiment illustrated in FIG. 1. It also reduces the possibility of coalescence in the shear mixing zone, as compared to that shown in FIG. 1. The orifice entrance 132 to the shear mixing zone 114 is defined by the radially inward edge of shoulders 122–122' and the intersection of walls 124–130 and 124'–130'. The cross-sectional area of the orifice entrance to the shear mixing zone is smaller than that of the combined areas of 116 and 116'. This increases the velocity of the fluid as it flows into the shear mixing zone. In this embodiment, the divergence and convergence of the two pairs of opposing walls of the shear mixing zone shape the fluid flow into a generally rectangular shape at the exit orifice 128, as is shown in FIG. 3(c). This is done to accommodate the flow from the nozzle 100, smoothly into the atomizing spray distribution tip 150, as shown in FIG. 4.

Figure 3A:
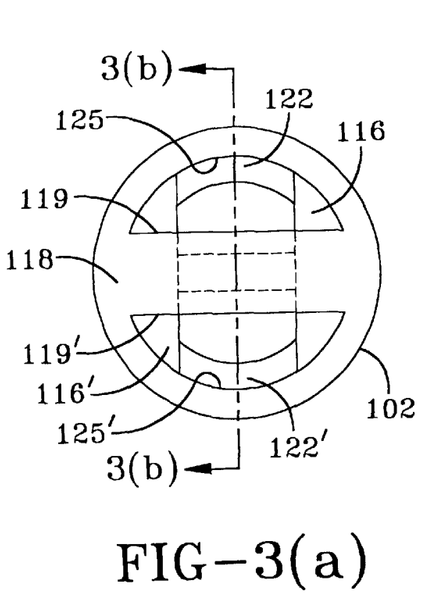
FIGS. 3(a) through 3(d) schematically illustrate various views of another embodiment of an atomizing nozzle of the invention, with FIGS. 3(a) and 3(c) being respective views from the upstream and downstream ends of the nozzle, FIG. 3(b) being a cut-away side view and FIG. 3(d) a partial cut-away top view of FIG. 3(c).
Figure 3B:
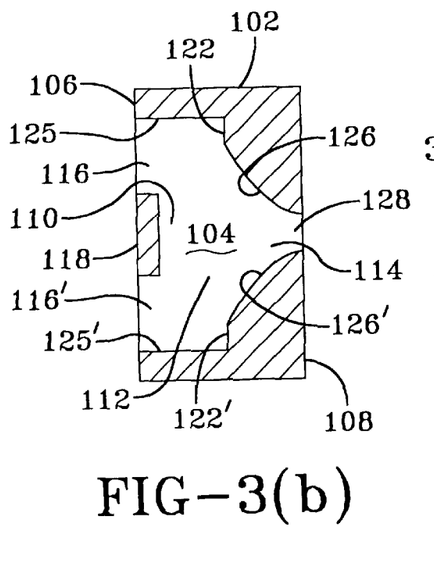
Figure 3C:
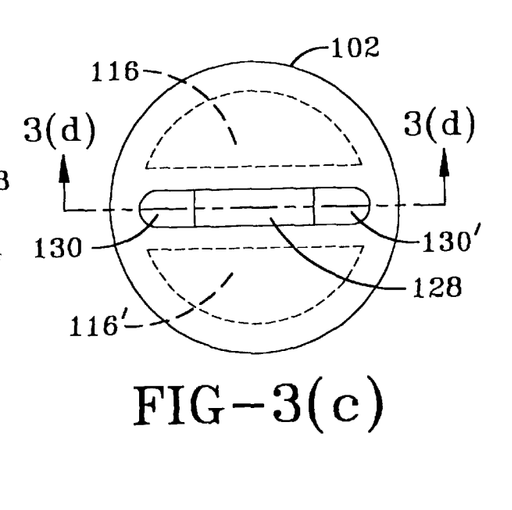
Figure 3D:
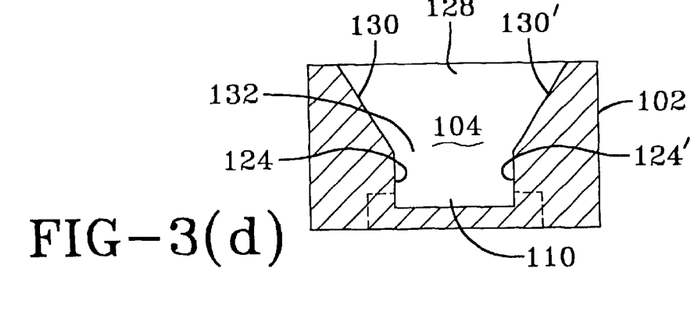
Figure 4A:
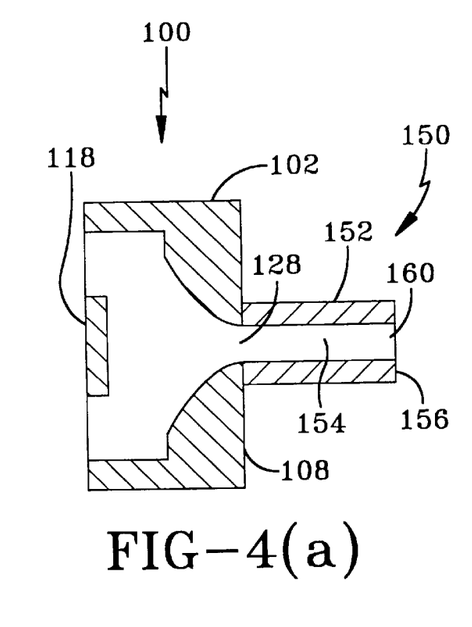
FIGS. 4(a) through 4(c) schematically illustrate three different views and a combination of the nozzle of FIG. 4 and a spray distributor tip.
Figure 4B:
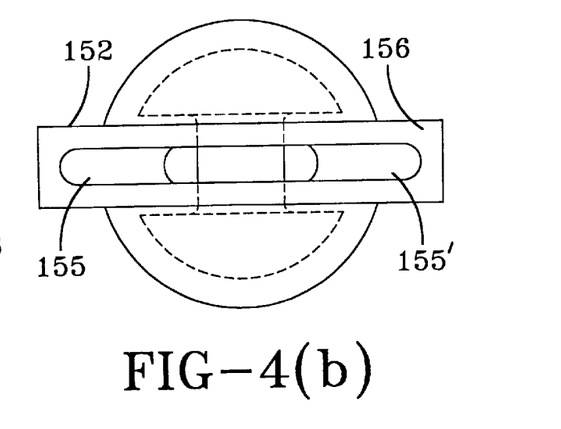
Figure 4C:
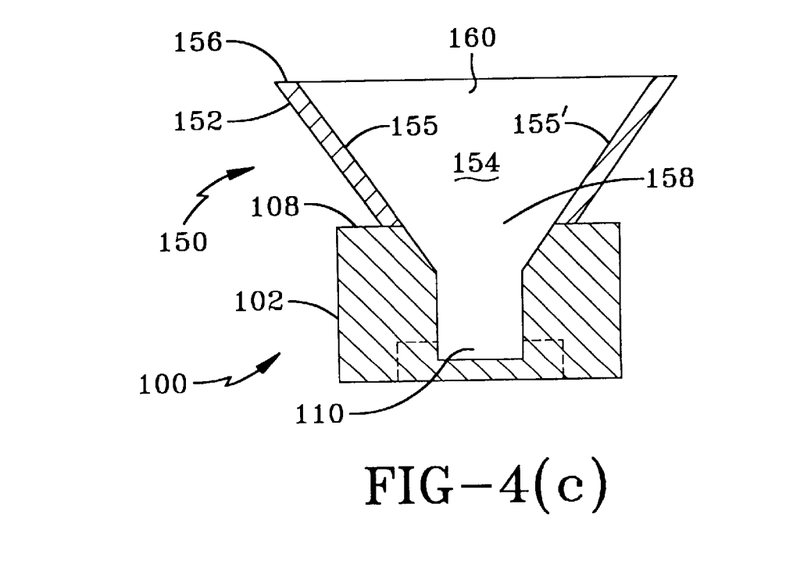
Figure 5:
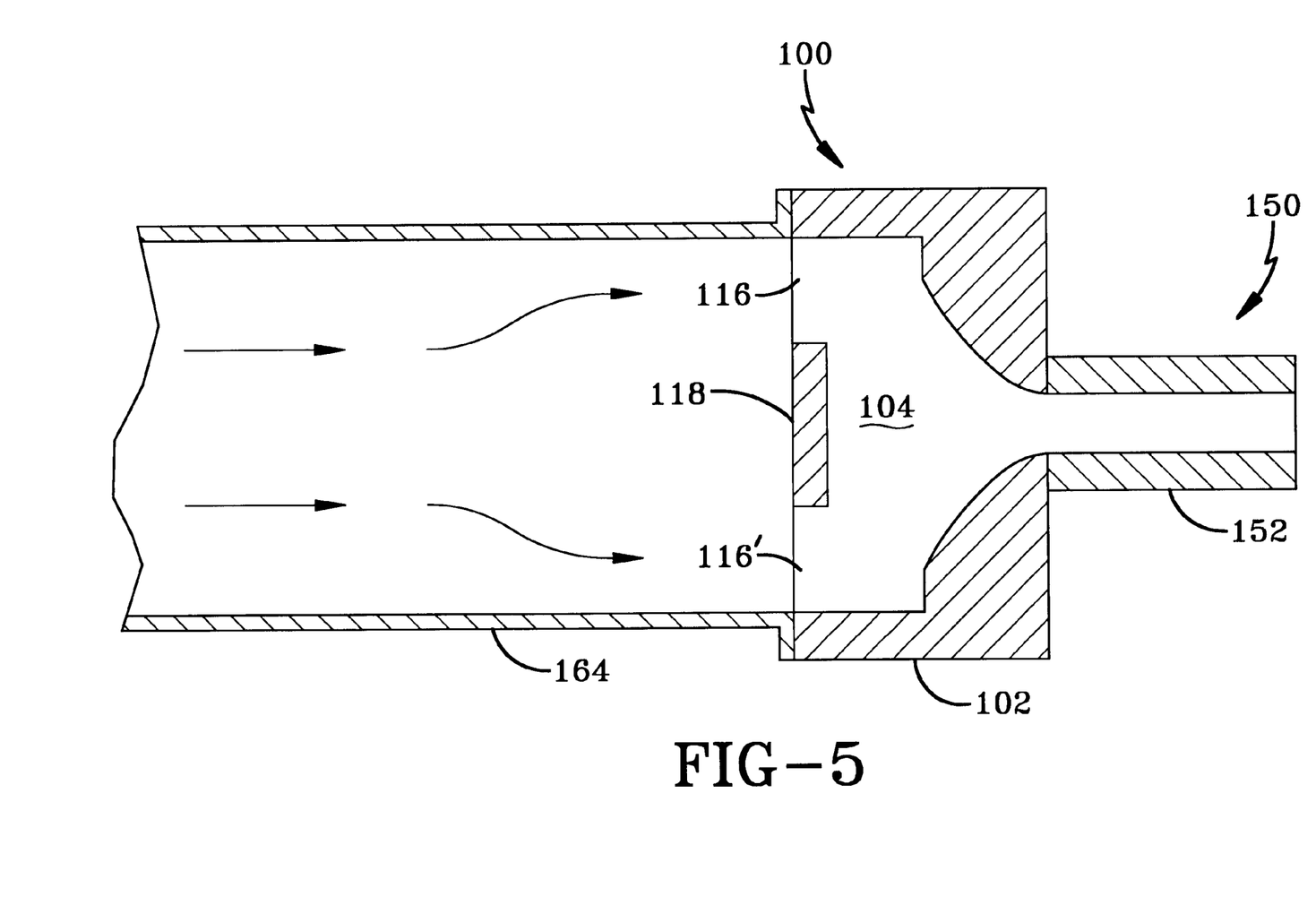
FIG. 5 is a cut-away schematic view of an atomizing nozzle and tip in association with an upstream fluid conduit.

Thus, turning to FIGS. 4(a), 4(b) and 4(c), it is seen that these Figures are similar to FIGS. 3(b), 3(c) and 3(d), respectively, with the exception of the atomizing spray distribution tip 150 adjacent and attached to the downstream orifice exit of the nozzle 102 in FIG. 4. This was omitted from FIG. 3, for clarity and ease in understanding the invention. Thus, atomizing spray distribution tip 150 comprises a generally fan-shaped body 152 containing a fan-shaped cavity 154 within, defined by opposing and outwardly diverging walls 155 and 155', which serves to control the expansion of the atomizing fluid, into a fan-shaped spray. The fluid entrance 158 of the tip corresponds in shape to the fluid exit 128 of the nozzle to which it is attached, while the exit 160 of the tip is larger, to permit the atomized spray of liquid drops to continue expanding into a fan-shaped spray. The pressure in 154 is lower than that in the nozzle cavity. The mixed fluid exiting the nozzle into the lower pressure atomizing cavity 154, atomizes into a fan-shaped spray of liquid droplets, which continue out of the exit end 156 of the tip and into a riser reaction zone of an FCC unit, such as that shown in FIG. 7. FIG. 5 schematically illustrates a cut-away view of an atomizing nozzle and tip, in association with an upstream fluid conduit. Fluid conduit 164 provides the flow path for the fluid from an upstream source to be split into two separate and equal fluid streams, which pass into the respective nozzle entrances 116 and 116'.

Figure 6A:
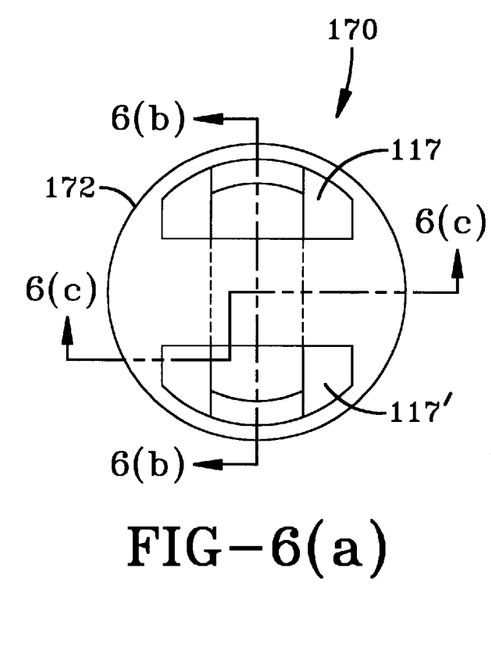
FIGS. 6(a) through 6(c) are views of an atomizing nozzle means of the invention similar to that illustrated in FIGS. 3 and 4, but wherein the shear mixing zone includes an atomizing orifice.
Figure 6B:
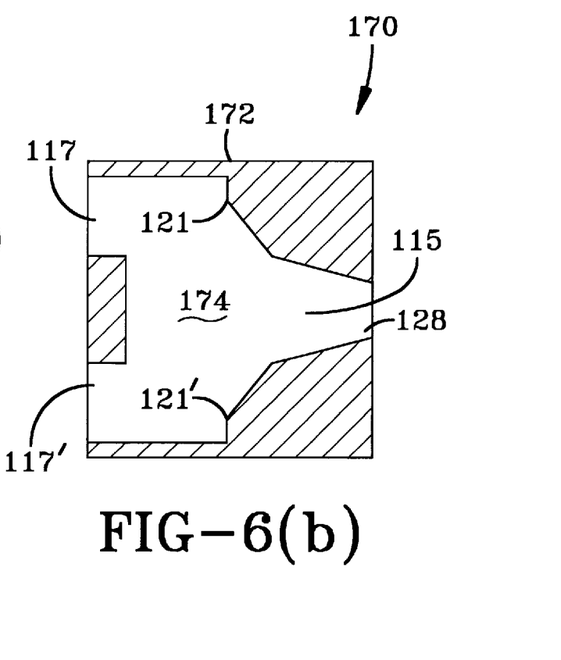
Figure 6C:
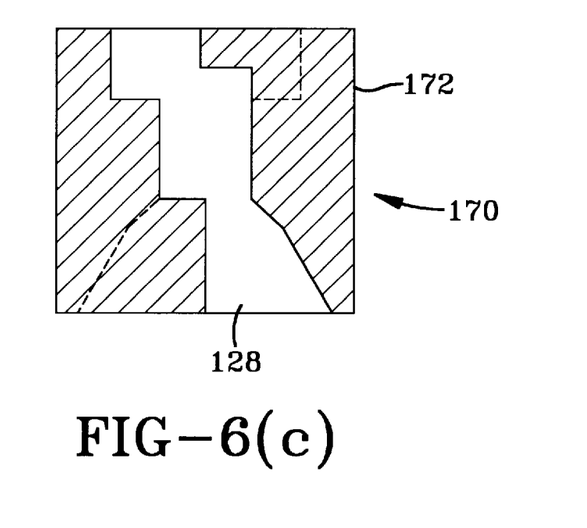

FIG. 6 is another embodiment of an atomizing nozzle of the invention in which the shear mixing zone is actually a compound zone which includes both shear mixing and atomization, by virtue of an atomizing zone in the shear mixing zone. Atomizing nozzle 170 shown in FIG. 6 is identical to nozzle 100 shown in FIGS. 3 and 4, except for the shape of the fluid inlet orifices and shear mixing zone. Thus, nozzle 170 includes a cylindrical body 172 containing a unitary cavity 174 within, for impact and shear mixing the two-phase fluid flowing through the nozzle. As shown in FIG. 6(a), fluid inlets 117 and 117' need not be complete segments, if the upstream feed conduit (e.g., 164 in FIG. 5) is sufficiently large to allow an acceptable nozzle entry pressure drop. The shear mixing zone 115, has a complex shape in which the cross-sectional area of the zone, starting upstream at 121 and 121', at first decreases and then increases, prior to the downstream fluid exit 128. Two partial cross-section views of the nozzle taken at 6(b)—6(b) and 6(c)—6(c) are shown in FIG. 6(b) and FIG. 6(c), to illustrate the somewhat complex nature of the shear mixing zone. In this embodiment, the atomizing zone comprises the region or zone of smallest cross-sectional area within the shear mixing zone and occurs between the beginning of the shear mixing zone at 121–121' and exit orifice 128. Orifice 128 is of the same size and shape as that in the nozzle illustrated in FIGS. 3 and 4. The shear mixing zone in this embodiment, also includes an atomizing means in the form of the zone of smallest cross-sectional area. In operation, as the two-phase fluid flows through the orifice and into a lower pressure atomizing zone downstream, atomization is promoted by the rapid gas expansion in the lower pressure in the atomizing zone and also by the more rapid acceleration of the lighter, compressible gas than the higher density (and incompressible) liquid phase. This induces shear until their velocities more nearly equalize. This shear further decreases the ultimate size of the oil droplets in the atomized spray.

Figure 7:
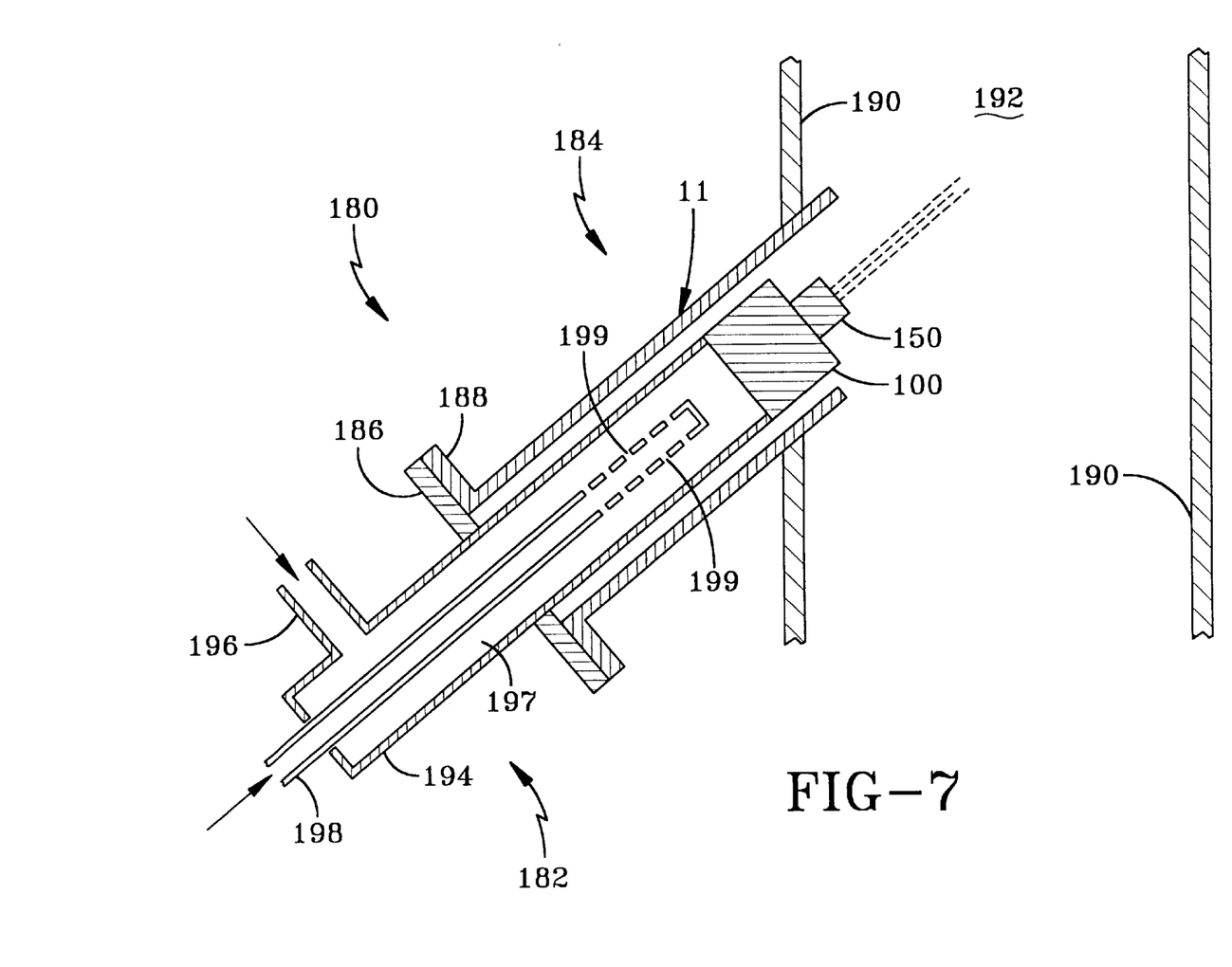
FIG. 7 is a schematic side view of an FCC feed injection unit employing a nozzle of the invention.

Referring now to FIG. 7, an FCC feed injection unit 180 useful in the practice of the invention comprises a hollow feed injector 182, attached to a nozzle means 184, by means of respective flanges 186 and 188. Nozzle means 184 is shown as a conduit penetrating through the wall 190 of an FCC riser and into the riser reaction zone 192. The riser is a cylindrical, hollow, and substantially vertically oriented conduit, in a portion of which (the riser reaction zone) the atomized oil feed contacts the uprising, hot catalyst particles and is cracked into more useful, lower boiling hydrocarbon products. Only a portion of the riser conduit is shown for convenience. The feed injector means 182 comprises a hollow conduit 194, into which the preheated oil feed is introduced via feed line 196, which forms a T-junction with the wall of the upstream portion of the injector. The downstream portion of the injector terminates in an impingement and shear mixing nozzle 100 of the invention, having a fan-shaped atomizing tip or distributor 150 as is illustrated in FIG. 4, both of which are shown as boxes for convenience. The fan-shaped distributor 150 produces a relatively flat, fan-shaped spray of the atomized oil into the riser reaction zone 192. A steam sparging conduit 198, having a smaller diameter or cross-sectional area than the injector conduit 194, extends into and is axially aligned with the longitudinal axis of conduit 194. In this embodiment, the central, longitudinal axes of both conduits are coincident. This provides an annular flow path 197 for the hot oil, upstream of the exit end of the injector. Steam conduit 198 terminates inside conduit 194, upstream of the nozzle 100. A plurality of holes or orifices 199, radially drilled circumferentially around the downstream end portion of 198, provide the means for sparging jets of steam radially out and into the annularly surrounding, hot oil flowing downstream towards the atomizing end of the injector. This produces a two-phase fluid comprising globules of hot oil dispersed in steam. The amount of steam sparged into the oil is typically between 1 and 5 wt. % of the hot oil feed. The resulting fluid mixture, which may typically comprise, on a volume basis, 75–85% steam and 15–25% oil, is passed to the nozzle 100 which splits it into two separate steams which separately enter the nozzle. The two streams are impingement mixed in the nozzle to form a single stream, which continues into and through the shear mixing zone in the nozzle. The mixing in the nozzle substantially reduces the size of the oil drops dispersed in the steam. As the fluid exits the orifice at downstream end of the nozzle, which is an atomizing orifice, it passes into the lower pressure controlled expansion zone defined by the interior of the atomizing tip. The atomizing orifice and controlled expansion zone (shown in FIG. 4) are both in fluid communication with the lower pressure riser reaction zone 192. The atomized spray of oil drops proceeds into the riser reaction zone 192, in which it contacts an upflowing stream of hot catalyst particles (not shown), which catalytically crack the heavy oil feed into the desired lower boiling product fractions.

Figure 8:
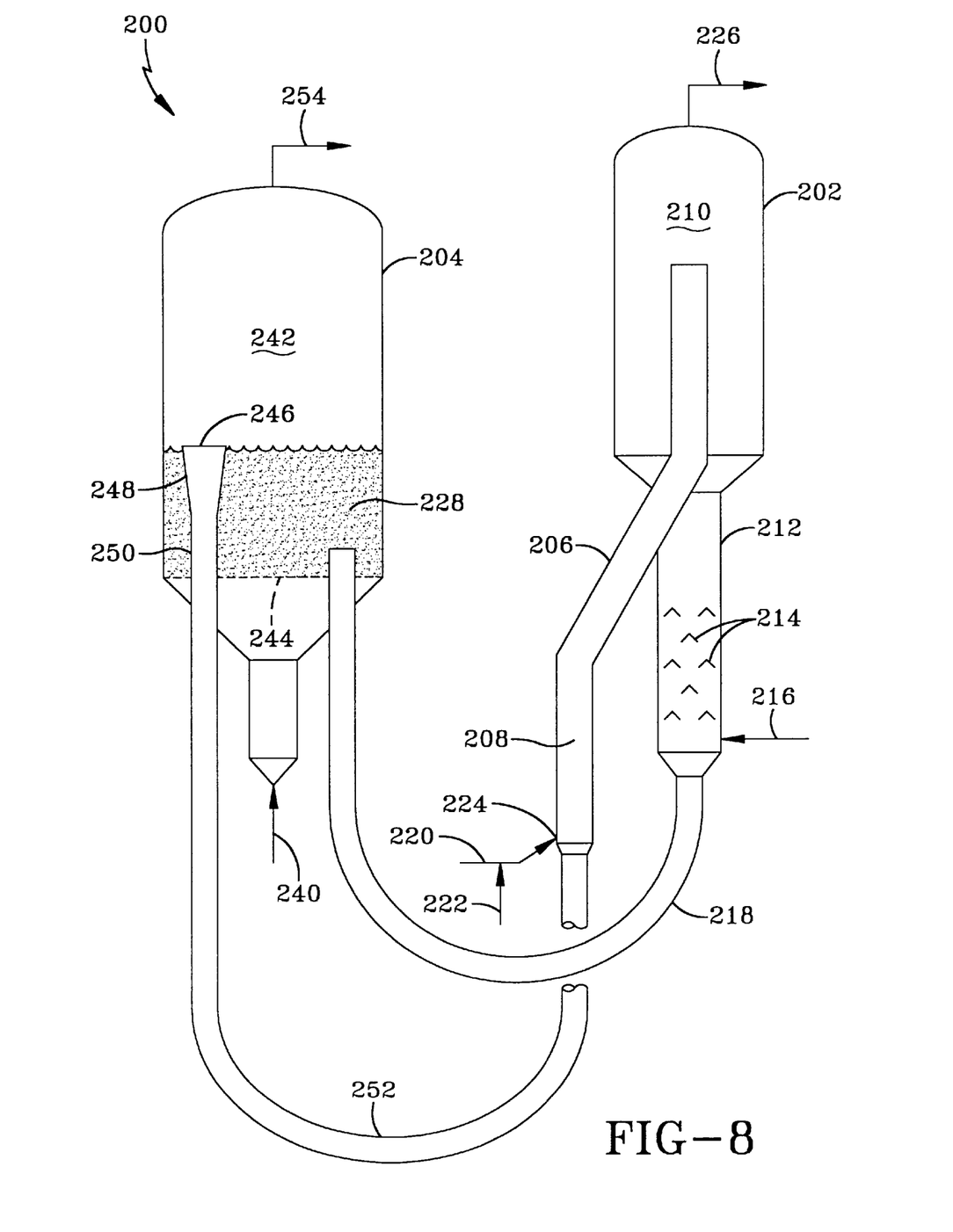
FIG. 8 is a simplified schematic of a fluid cat cracking process useful in the process of the invention.

FIG. 8 is a simplified schematic of a fluid cat cracking process used in conjunction with a feed injection method and atomizing nozzle means of the invention. Thus, an FCC unit 200 useful in the practice of the invention is shown comprising a catalytic cracking reactor unit 202 and a regeneration unit 204. Unit 202 includes a feed riser 206, the interior of which comprises the reaction zone, the beginning of which is indicated as 208. It also includes a vapor-catalyst disengaging zone 210 and a stripping zone 212 containing a plurality of baffles 214 within, in the form of arrays of metal "sheds" which resemble the pitched roofs of houses. A suitable stripping agent such as steam is introduced into the stripping zone via line 216. The stripped, spent catalyst particles are fed into regenerating unit 204 via transfer line 218. A preheated FCC feed is passed via line 220 into the base of riser 206 at feed injection point 224 of the fluidized cat cracking reactor unit 202. The feed injector shown in FIG. 6 is located at 224, but is not shown in this Figure, for simplicity. In practice, a plurality of feed injectors will be circumferentially located around the feed injection area of the riser. The feed injectors will be of the type illustrated in FIG. 7. Steam is injected into the feed injection unit via line 222. As set forth below, the feed may comprise a mixture of a vacuum gas oil (VGO), a heavy feed component, such as a resid fraction, and mixtures thereof. The atomized droplets of the hot feed are contacted with particles of hot, regenerated cracking catalyst in the riser. This vaporizes and catalytically cracks the feed into lighter, lower boiling fractions, including fractions in the gasoline boiling range (typically 100–400° F.), as well as higher boiling jet fuel, diesel fuel, kerosene and the like. The cracking catalyst is a mixture of silica and alumina containing a zeolite molecular sieve cracking component, as is known to those skilled in the art. The catalytic cracking reactions start when the feed contacts the hot catalyst in the riser at feed injection point 224 and continues until the product vapors are separated from the spent catalyst in the upper or disengaging section 210 of the cat cracker. The cracking reaction deposits strippable hydrocarbonaceous material and non-strippable carbonaceous material known as coke, to produce spent catalyst particles which must be stripped to remove and recover the strippable hydrocarbons and then regenerated by burning off the coke in the regenerator. Reaction unit 202 contains cyclones (not shown) in the disengaging section 210, which separate both the cracked hydrocarbon product vapors and the stripped hydrocarbons (as vapors) from the spent catalyst particles. The hydrocarbon vapors pass up through the reactor and are withdrawn via line 226. The hydrocarbon vapors are typically fed into a distillation unit (not shown) which condenses the condensable portion of the vapors into liquids and fractionates the liquids into separate product streams. The spent catalyst particles fall down into stripping zone 212 in which they are contacted with a stripping medium, such as steam, which is fed into the stripping zone via line 216 and removes, as vapors, the strippable hydrocarbonaceous material deposited on the catalyst during the cracking reactions. These vapors are withdrawn along with the other product vapors via line 226. The baffles 214 disperse the catalyst particles uniformly across the width of the stripping zone or stripper and minimize internal refluxing or backmixing of catalyst particles in the stripping zone. The spent, stripped catalyst particles are removed from the bottom of the stripping zone via transfer line 218, from which they are passed into fluidized bed 228 in regenerator 204. In the fluidized bed they are contacted with air entering the regenerator via line 240 and some pass up into disengaging zone 242 in the regenerator. The air oxidizes or burns off the carbon deposits to regenerate the catalyst particles and in so doing, heats them up to a temperature which typically ranges from about 950–1400° F. Regenerator 204 also contains cyclones (not shown) which separate hot regenerated catalyst particles from the gaseous combustion products (flue gas), which comprises mostly $CO_2$, CO, $H_2O$ and $N_2$ and feed the regenerated catalyst particles back down into fluidized catalyst bed 228, by means of diplegs (not shown), as is known to those skilled in the art. The fluidized bed 228 is supported on a gas distributor grid, which is briefly illustrated as dashed line 244. The hot, regenerated catalyst particles in the fluidized bed overflow the weir 246 formed by the top of a funnel 248, which is connected at its bottom to the top of a downcomer 250. The bottom of downcomer 250 turns into a regenerated catalyst transfer line 252. The overflowing, regenerated particles flow down through the funnel, downcomer and into the transfer line 252 which passes them back into the riser reaction zone, in which they contact the hot feed entering the riser from the feed injector. The flue gas is removed from the top of the regenerator via line 254.

Cat cracker feeds used in FCC processes typically include gas oils, which are high boiling, non-residual oils, such as a vacuum gas oil (VGO), a straight run (atmospheric) gas oil, a light cat cracker oil (LCGO) and coker gas oils. These oils have an initial boiling point typically above about 450° F. (232° C.), and more commonly above about 650° F. (343° C.), with end points up to about 1150° F. (621° C.), as well as straight run or atmospheric gas oils and coker gas oils. In addition, one or more heavy feeds having an end boiling point above 1050° F. (e.g., up to 1300° F. or more) may be blended in with the cat cracker feed. Such heavy feeds include, for example, whole and reduced crudes, resids or residua from atmospheric and vacuum distillation of crude oil, asphalts and asphaltenes, tar oils and cycle oils from thermal cracking of heavy petroleum oils, tar sand oil, shale oil, coal derived liquids, syncrudes and the like. These may be present in the cracker feed in an amount of from about 2 to 50 volume % of the blend, and more typically from about 5 to 30 volume %. These feeds typically contain too high a content of undesirable components, such as aromatics and compounds containing heteroatoms, particularly sulfur and nitrogen. Consequently, these feeds are often treated or upgraded to reduce the amount of undesirable compounds by processes, such as hydrotreating, solvent extraction, solid absorbents such as molecular sieves and the like, as is known. Typical cat cracking conditions in an FCC process include a temperature of from about 800–1200° F. (427–648° C.), preferably 850–1150° F. (454–621° C.) and still more preferably 900–1150° F. (482–621° C.), a pressure between about 5–60 psig, preferably 5–40 psig with feed/catalyst contact times between about 0.5–15 seconds, preferably about 1–5 seconds, and with a catalyst to feed ratio of about 0.5–10 and preferably 2–8. The FCC feed is preheated to a temperature of not more than 850° F., preferably no greater than 800° F. and typically within the range of from about 500–800° F.

The invention will be further understood with reference to the following example.

EXAMPLE

In this experiment, an atomizing injector was used similar in design to that shown in FIG. 7 and had an atomizing nozzle of the invention similar in design to that shown in FIG. 4. The operation of this injector was compared to that of a commercially proven slot and fan design, similar to that shown in U.S. Pat. No. 5,173,175. The commercial nozzle simulated a pipe with an end cap containing a rectangular, slotted orifice, with an attached downstream diverging flat fan atomizing tip. Both nozzles included a fan-shaped atomizing distributor or tip and were fabricated at a scale of one half the size of a typical commercial nozzle. The injector was the same for both cases, with the difference between them being in the nozzle design. Both injectors produced a flat, fan-shaped spray and were mounted horizontally and oriented to produce a flat, fan-shaped spray with the maximum width in the vertical direction, in the laser light beam path of a Malvern particle sizer. This instrument is well known and used for measuring liquid spray characteristics. Light diffraction patterns, each associated with a characteristic drop size range, are focused by a Fourier transform lens onto a multi-element photodetecter. The light energy distribution is converted, via a computer, into a corresponding liquid droplet size distribution.

A grid of comparative experiments was conducted varying water and nitrogen flow rates and the Sauter mean liquid drop diameter was calculated, assuming a Rosin-Rammier distribution function. The results for the two different nozzle designs are compared in the Table below.

| Injector Type | Water mass lb/sec | Nitrogen scf/sec | Sauter mean diameter microns |
|---|---|---|---|
| Commercial Fan | 4.93 | 0.93 | 283 |
| | 4.99 | 0.39 | 442 |
| | 4.47 | 0.62 | 313 |
| | 3.64 | 0.40 | 451 |
| | 3.53 | 0.94 | 253 |
| The Invention | 4.84 | 0.93 | 252 |
| | 4.97 | 0.40 | 342 |
| | 4.36 | 0.63 | 291 |
| | 3.46 | 0.39 | 262 |
| | 3.52 | 1.00 | 162 |

In all cases, at comparable water and nitrogen flow rates, the nozzle of the invention produced an atomized spray having smaller Sauter mean diameter liquid droplets, than did the commercial design. This shows that better atomization was achieved with the nozzle of the invention.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

What is claimed is:

1. A process for atomizing a liquid into a spray of liquid drops which comprises:
    (a) at a position upstream of an impingement mixing zone, forming at least two fluid streams from a single stream comprising a liquid phase;
    (b) passing said at least two fluid streams through separate fluid entrances into an expansion zone, said fluid entrances upstream from said expansion zone, said expansion zone positioned between and in direct fluid communication with both said impingement mixing zone and said fluid entrances, wherein said expansion zone and each said fluid entrance have cross-sectional areas perpendicular to the flow direction of said fluid, said expansion zone cross-sectional area being greater than the sum of the cross-sectional areas of said fluid entrances;
    (c) separately passing said at least two fluid streams of a two-phase fluid comprising the liquid to be atomized, said two-phase fluid comprising a gas phase and said liquid phase, through an impingement mixing zone under pressure, wherein at least a portion of each said stream mixes with the other to form a single mixed stream wherein the surface area of said liquid phase in said mixed stream is greater than the combined surface area of said liquid phase in said at least two fluid streams prior to entering said impingement zone; wherein at least a portion of each stream is impinged against at least a portion of another stream at an included angle between about 120 degrees and 140 degrees; wherein the surface area of the liquid phase in said single mixed stream is greater than the surface area 6 of the liquid phase in said single stream before said single stream splits into said at least two streams;
    (d) passing said single mixed stream through a shear mixing zone to further increase the surface area of said liquid phase to form a shear-mixed stream, wherein said impingement mixing zone and said shear mixing zone are both part of a single cavity, and wherein said cavity comprises a downstream exit in fluid communication with a lower pressure atomizing zone; and,
    (e) passing said shear-mixed stream though an atomizer comprising an orifice and then into said lower pressure atomizing zone wherein said gas phase expands to form a spray of liquid drops, wherein said atomizing zone shapes said spray to a desired shape, said atomizer having a cross-sectional area normal to said fluid flows direction, said orifice cross-sectional area being smaller than the sum of the cross-sectional areas of said fluid entrances.

2. A process according to claim 1 wherein said impingement mixing zone has a cross-sectional area normal to the flow of said fluid, said impingement mixing zone cross-sectional area being smaller at the downstream exit of said impingement mixing zone, than at an upstream entrance to said impingement mixing zone.

3. A process according to claim 1 wherein said atomizer is configured as part of said shear mixing zone.

4. A process according to claim 1 wherein each said fluid entrance comprises an orifice adjacent to the upstream portion of said expansion zone.

* * * * *